(12) United States Patent
Sharma et al.

(10) Patent No.: US 8,670,310 B2
(45) Date of Patent: Mar. 11, 2014

(54) DYNAMIC BALANCING PRIORITY QUEUE ASSIGNMENTS FOR QUALITY-OF-SERVICE NETWORK FLOWS

(75) Inventors: Puneet Sharma, Palo Alto, CA (US); Wonho Kim, Princeton, NJ (US); Jung Gun Lee, Palo Alto, CA (US); Sung-Ju Lee, San Francisco, CA (US); Jean Tourrilhes, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 564 days.

(21) Appl. No.: 12/974,767

(22) Filed: Dec. 21, 2010

(65) Prior Publication Data

US 2012/0155264 A1 Jun. 21, 2012

(51) Int. Cl.
*G01R 31/08* (2006.01)

(52) U.S. Cl.
USPC .......................................... 370/230; 370/232

(58) Field of Classification Search
USPC ................................................ 370/229–240
See application file for complete search history.

(56) References Cited

U.S. PATENT DOCUMENTS

| | | | |
|---|---|---|---|
| 5,914,934 A | 6/1999 | Rathnayelu | |
| 7,542,440 B2 | 6/2009 | Rajkotia | |
| 2008/0285560 A1 | 11/2008 | Curtis et al. | |
| 2010/0008228 A1 | 1/2010 | Chakravorty | |
| 2010/0269003 A1* | 10/2010 | Ito et al. | 714/731 |
| 2010/0284278 A1* | 11/2010 | Alanara | 370/235 |

OTHER PUBLICATIONS

Online: Joan Triay et al: "QoS-enabled Distributed Access on Optical Burst-switched Networks" http://ieeexplore.ieee.org/stamp/stamp.jsp?arnumber=5431586 > Publication Date: Feb. 1-3, 2010; pp. 1-6.
Yu Zhou et al: "RL-based Queue Management for QoS Support in Multi-channel Multi-radio Mesh Networks" Publication Date: 2009; On pp. 306-309.

* cited by examiner

*Primary Examiner* — Kwang B Yao
*Assistant Examiner* — Tung Q Tran
(74) *Attorney, Agent, or Firm* — Marcia Chang (57) ABSTRACT

A priority queue assignment technique for quality-of-service ("QoS") network flows in a network is provided. A network path is determined for an incoming flow including a plurality of network switches associated, with a plurality of priority queue levels. A priority queue level is determined for the incoming flow for at least one of the plurality of network switches in the network path based on priority queue levels of existing flows. The priority queue level of the incoming flow is adjusted, to dynamically balance flows over the plurality of priority queue levels for at least one of the plurality of network switches in the network path based on quality-of-service ("QoS") requirements associated with the incoming flow.

16 Claims, 11 Drawing Sheets

DYNAMIC BALANCING PRIORITY QUEUE ASSIGNMENTS FOR QUALITY-OF-SERVICE NETWORK FLOWS

CROSS REFERENCE TO RELATED APPLICATIONS

This application contains some common subject matter to U.S. patent application Ser. No. 12/768,722, entitled "Dynamic Priority Queue Level Assignment for a Network Flow", filed on Apr. 27, 2010, and U.S. patent application Ser. No. 12/768,723, entitled "Priority Queue Level Optimization for a Network Flow", filed on Apr. 27, 2010, herein incorporated by reference in their entirety.

BACKGROUND

The scale of computing infrastructure has experienced explosive growth at least partially due to multiple applications and services being supported on a single network fabric. For instance, data centers and enterprises commonly support multiple applications and services on the same infrastructure. The infrastructure typically includes one or more networks supporting the traffic of the multiple applications and services, all with specific performance requirements that need, to be satisfied, such as, for example, different bandwidths, latencies, error rates, jitter rates, and the like.

The ability to provide the required performance to different applications and services is commonly referred to as quality-of-service ("QoS"). A network that supports QoS may agree on a set of requirements with, each application and service and reserve network capacity and resources to achieve the desired performance. The network may monitor the performance during a session and make adjustments as needed. For example, the network may assign different scheduling priorities for servicing different types of traffic (e.g., low bandwidth vs. high bandwidth traffic), and adjust the priorities to meet a set of QoS requirements or guarantees. Such QoS guarantees ensure that network resources are used efficiently for multiple applications and services.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

A network architecture is disclosed to automatically and flexibly program a network of devices (e.g., network switches) with multiple quality-of-service ("QoS") parameters, derived from a high-level specification of service and/or application performance requirements. The network architecture includes a QoS controller that enables the dynamic creation of network slices for different services and/or applications and the dynamic provisioning of the slices to satisfy performance requirements across all services and/or applications. Network administrators specify high-level QoS requirements for the slices, services, applications, and/or customers, and the QoS controller automatically reserves network resources to reserve given performance requirements. A network slice, as generally-described herein, is a portion of a network used by a flow to send packets.

In various embodiments, the QoS controller determines a network path for each incoming network flow. A network flow, or flow, as generally described herein, is an aggregation of packets between a source and a destination in a network. A flow may be a subset of another flow and may be bidirectional or unidirectional. A single flow may be disaggregated into multiple flows, and conversely, multiple flows may be aggregated into a single flow. Examples of network flows include Hypertext Transport Protocol ("HTTP") packets between two hosts, Dynamic Name Server ("DNS") requests between a client and a server, video streaming packets, instant messaging packets, or any other aggregation or collection of packets transmitted between a source and a destination.

A network path (or path) includes a plurality of switches/hops in a network. Each or some of the network switches in a network path may be associated, with a set of priority queues to maintain QoS requirements. A priority queue, as generally described herein, is designated with a priority queue level for holding different flows. For example, a switch may have 5 priority queues, designated with priority levels $q_1$-$q_5$ in order of priority. A QoS requirement, as generally described herein, is a performance metric that should be met for a flow. Examples of performance metrics may include bandwidth, latency, and loss rate, among others. A QoS requirement may be predetermined, based on a class of flow, which may have one or multiple QoS requirements.

In accordance to various embodiments, the QoS controller dynamically assigns priority queue levels for an incoming flow based on QoS requirements for the incoming flow and QoS requirements for existing flows at one or more switches in the network path. In doing so, the QoS controller can assign a given flow to different priority queue levels in at least one switch depending on the current workloads in the network path. For example, if a given switch has many delay-sensitive flows, the QoS controller may assign an incoming flow to a low priority queue to avoid violating the existing delay-sensitive flows. Since this can lead to a longer per-hop delay for the incoming flow, the QoS controller can increase the flow's priority in other switches on the path in order to satisfy the end-to-end delay requirement of the flow.

Once a flow is admitted, the QoS controller may assign it to the highest priority queue level in at least one switch in order to deliver a low end-to-end delay. The QoS controller can put the flow into a high priority queue even when the flow's delay requirement can be satisfied in a lower priority queue based on the current state of existing flows. However, this may lead to rejecting flows with tight delay specifications (i.e., tight QoS flows) because of flows with loose delay specifications (i.e., loose QoS flows) occupying the high priority queue.

Accordingly, as described in more detail herein below for various embodiments, after a flow is admitted to a given queue, its queue assignment may be adjusted depending on the delay specifications of the flow and the end-to-end delay the flow would experience in the path. The adjustment enables loose QoS flows yield the high priority queue to tight QoS flows, which does not decrease the possibility of rejecting the loose QoS flows, but rather, increases the overall admission ratio of flows in the network.

Through implementation of the embodiments, the performance of an incoming flow may be preserved even when faced with unexpected events of other flows. Also, diverse QoS requirements of different flows may be concurrently satisfied in a single network.

It is appreciated that the embodiments below are generally described with respect to a new flow that is entering the network and may be applied to various networks. However, the embodiments are applicable to any flow, new or existing. It is also appreciated that for simplicity and illustrative purposes, the present application is described by referring mainly to examples of embodiments.

In the following description, numerous specific details are set forth to provide a thorough understanding of the embodiments. However, it is appreciated that the embodiments may be practiced without limitation to these specific details. In other instances, well known methods and structures may not be described in detail to avoid unnecessarily obscuring the description of the embodiments. Also, the embodiments may be used in combination with each other.

Figure 1:
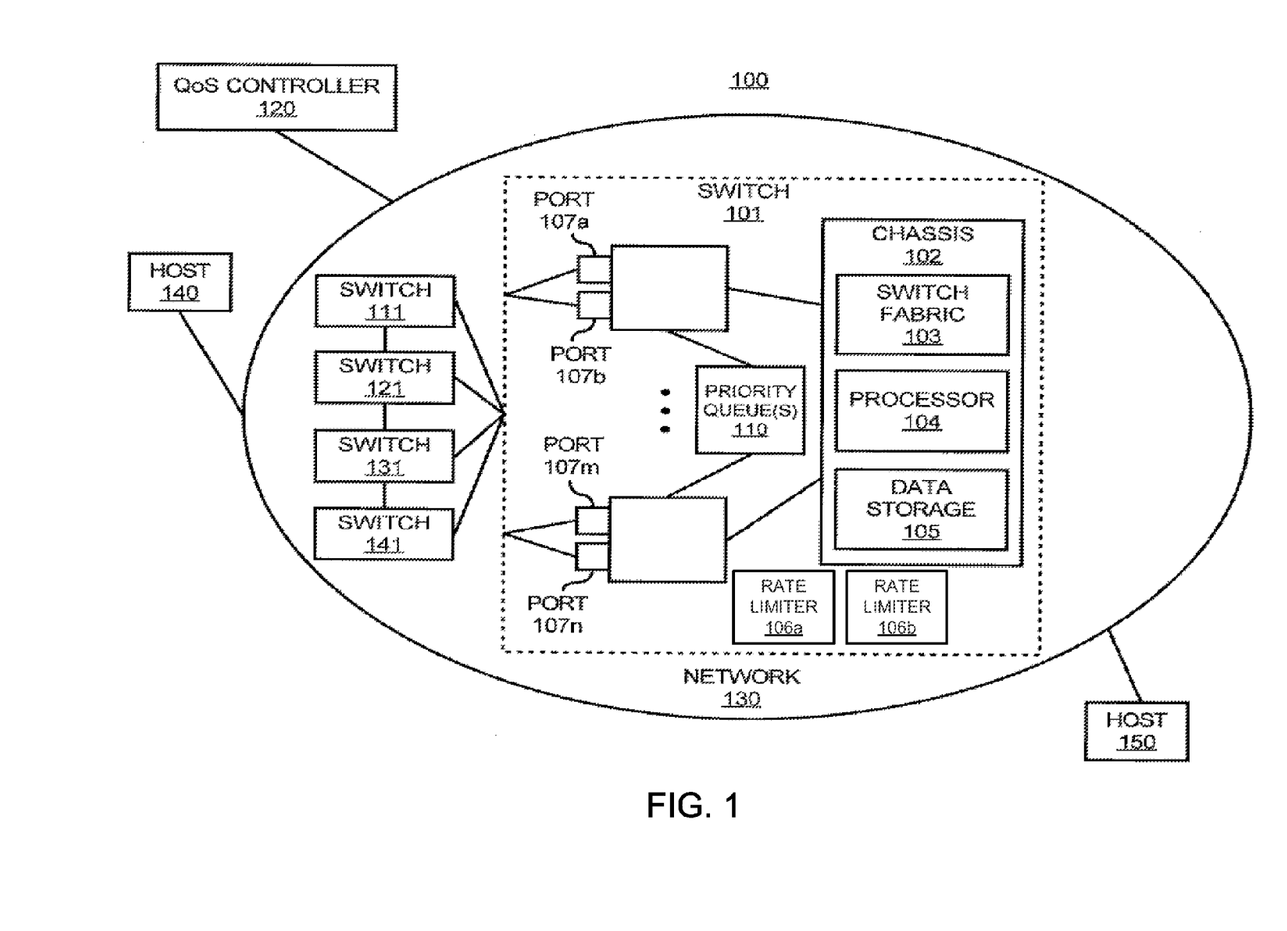
FIG. 1 illustrates an example of network architecture on which embodiments may be implemented.

Referring now to FIG. 1, an example of a network architecture on which the embodiments may be implemented is illustrated. In various implementations, the network architecture 100 may include additional components and some of the components described herein may be removed and/or modified, without departing from a scope of the architecture 100.

According to various embodiments, the network architecture 100 may include one or more switches in a network 130, such as, for example, a switch 101, a switch 111, a switch 121, a switch 131 and a switch 141, a QoS controller 120, and one or more hosts, such as, for example, a host 140 and a host 150. The QoS controller 120 may be a node in the network 130, such as a server or other computer system, or the QoS controller 120 may be integrated in a network device, such as a switch or a gateway. Although not shown, the QoS controller 120 may be replicated or its function split among multiple QoS controllers throughout the network 130. Additionally, the network architecture 100 may include any number of switches, hosts, and other types of network devices (or "nodes"). Network devices, as generally described herein, may include any device that can connect to the network 130, such as, for example, switches, gateways, or computer systems connected to the network (e.g., servers or end-user devices), among others. In addition, the hosts 140 and 150 may also include source devices and destination devices.

One or more switches in the network 130 (e.g., switches 101, 111, 121, 131, and 141) may include multiple ports. For example, the switch 101 includes a set of ports 107a-n that receive and send flows in the network 130. The switch 101 may also include one or more priority queues 110 that may be located in one or more of the ports 107a-n. Each priority queue 110 is designated with a priority queue level for holding different flows. For example, the switch 101 may have 5 priority queues, designated with priority levels $q_1$-$q_5$ in order of priority. It is appreciated that any given port, such as one of the ports 107a-n, may have a priority queue level for a given flow, and different ports among the ports 107a-n may have different priority queue levels for different flows.

In accordance to various embodiments, as packets for an incoming flow are received, they are stored in a priority queue and then processed for routing towards a destination according to their priority queue level. For example, packets in higher priority queue levels may be served before packets in the lower priority queue levels. Priority queue levels for a flow at different switches may be determined based, on the QoS requirements for the flow relative to the QoS requirements for other existing flows.

A switch may also include a chassis, such as, for example, the chassis 102 in the switch 101. The chassis 102 may include a switch fabric 103, a processor 104, and a data storage 105. The switch fabric 103 may include a high-speed transmission medium for routing packets between the ports 107a-n internally in the switch 101. The switch 101 may be configured to maximize a portion of packet processing. The processor 104 and the data storage 105 may be used for processing, or storing data. The switch 101 may further include rate limiters 106a-b, which may limit the amount of flow traffic entered into the network 130 from source devices, such as the host 140 or the host 150. It is appreciated that the number of rate limiters 106a-b included in a given switch may be flexible.

In various embodiments, the QoS controller 120 may determine local rules for the switches 101-141 based on loads derived from measurements received from switches in the network 130 and based on global policies and network topology. The QoS controller 120 sends the local rules to the switch 101 over the network 130.

The QoS controller 120 also provides a global set of rules for the network 130. For instance, an administrator may enter the global set of rules into the QoS controller 120, via, for example, a graphical user interface ("GUI"). The QoS controller 120 thereafter maintains global policies using the global set of rules for the network 130. The global rules may be based on QoS and performance goals. The QoS controller 120 determines a current load on the switches in the network 130, for example, based on metric reports from nodes in the network 130. The QoS controller 120 also maintains a current topology of the network 130 through communication with the switch 101 and other nodes (e.g., switches) in the network 130. The QoS controller 120 may communicate directly with a node to receive metric reports and perform other functions.

The QoS controller 120 may use the topology of the network 130 and the load on the network 130 in a feedback control system to direct switches, including the switch 101, to make adjustments to maintain global policies specified in the global rules. For instance, certain flows in the switch 101, as specified by rules provided by the QoS controller 120, may be rate limited, or may be routed through other switches in the network 130 or put in different priority queues.

In one embodiment, based on local rules received, from the QoS controller 120 and stored at the switch 101, the switch 101 may thereafter reliably forward one or more flows using a single path or multiple paths as defined in the local rules. The QoS controller 120 may asynchronously (i.e., independent of a flow setup request) send an update to the switch 101 to change the local rules at the switch 101. New local rules may be received in an instruction from the QoS controller 120 based on the metric report. For instance, a flow may be rate-limited depending on bit rate through other switches in the network 130. Alternatively, the QoS controller 120 may place a timeout or expiration (in terms of seconds) or a limit (in terms of a number of flows) on the switch 101.

Figure 2:
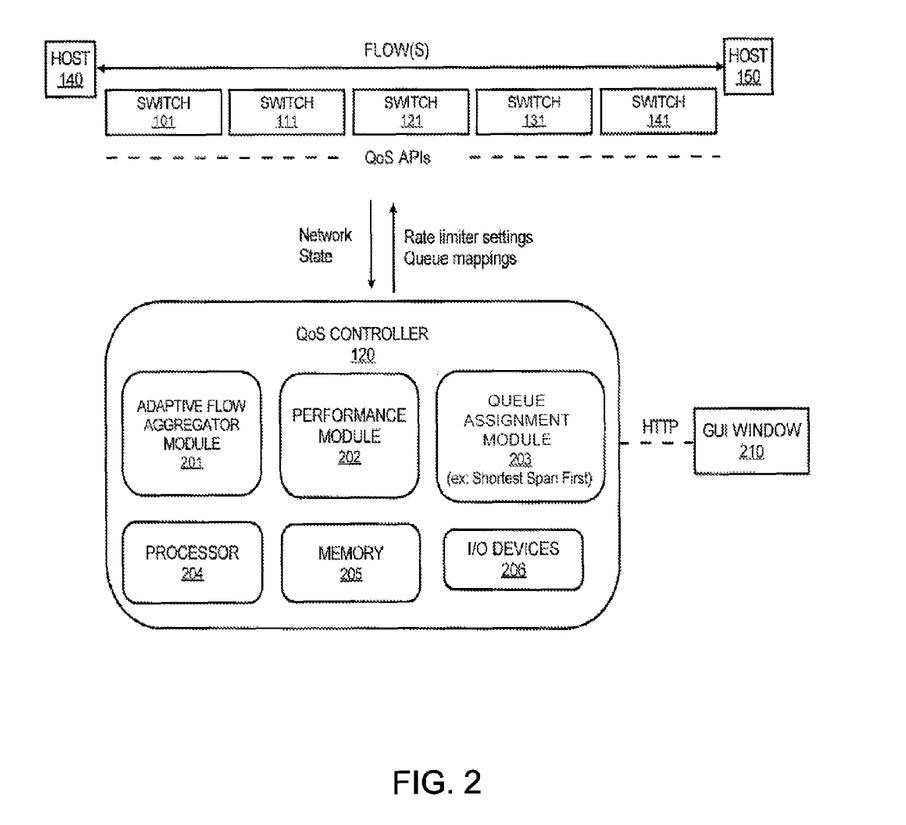
FIG. 2 is an example block diagram of the QoS controller of FIG. 1 in more detail.

Attention is now directed to FIG. 2, which illustrates an example block diagram of the QoS controller 120 of FIG. 1 in more detail. QoS controller 120 may interface with switches 101-141 via application program interfaces ("APIs"), such as, for example, QoS APIs, or any other routing protocol or APIs (e.g., OpenFlow APIs). In one embodiment, the QoS controller 120 may include an adaptive flow aggregator module 201, a performance module 202, a queue assignment module 203, a processor 204, a memory 205, and I/O devices 206.

The modules 201-203 may comprise software modules, hardware modules, or a combination of software and hardware modules. Thus, in one embodiment, one or more of the modules 201-203 may comprise circuit components. In another embodiment, one or more of the modules 201-203 may comprise software code stored on a computer readable storage medium, which is executable by a processor. Although the adaptive flow aggregator module 201, the performance module 202, and the queue assignment module 203 have been depicted, as components inside the QoS controller 120, it is appreciated, that these modules may be separate from the QoS controller 120 without departing from a scope of the QoS controller 120.

According to various embodiments, the QoS controller 120 may be used to execute one or more computer programs performing the methods, steps and functions described herein. The processor 204 provides an execution platform for executing the computer programs and communicates with switches in a network, such as, for example, switches 101-141. The processor 204 further determines a path for a new incoming flow, which may include the switches 101-141. It is appreciated that the computer programs may also be stored in computer storage mediums.

The memory 205 may be a main memory, such as a Random Access Memory ("RAM"), where software may reside during runtime. The memory 205 may also be a secondary memory. The secondary memory may include, for example, a non-volatile memory where a copy of software may be stored. In one example, the secondary memory may include a Read Only Memory ("ROM"), an Erasable, Programmable ROM ("EPROM"), an Electrically Erasable, Programmable ROM ("EEPROM"), and/or any other data storage device, including hard disks. The main memory or the secondary memory may store the priority queue levels of different flows at different switches. The I/O devices 206 may include a display and/or user interfaces comprising one or more I/O devices, such as a keyboard, a mouse, a stylus, a speaker, and the like.

According to various embodiments, when a new flow arrives, the QoS controller 120 may first determine a network path for the flow and apply the adaptive flow aggregator module 201 (as described below with reference to FIG. 4) to the new flow for better scalability, that is, the adaptive flow aggregator module 201 may aggregate the new flow with other flows. The QoS controller 120 may then estimate the performance that the new flow may experience in the network 130 with the performance module 202 (as described below with reference to FIG. 6).

The estimated performance is used in the queue assignment module 203 to determine priority queue level assignments for the new flow at one or more of the switches in the network path, e.g., switches 101-141. A priority queue level, as generally described herein, is a priority queue level that is determined based at least on one or more QoS requirements for the flow and may additionally be based on network state and other information. Network state may include information about network topology and performance metrics as determined in the performance module 202. In one embodiment, the priority queue levels for the new flow are determined based on the QoS requirements for the new flow and on the priority queue levels of one or more existing flows in the network 130.

The QoS controller 120 sends the priority queue levels of the new flow to at least one of the switches in the network 130 (e.g., switches 101-141). It is appreciated that the priority queue levels for a given new flow may be different at different switches. It is also appreciated that a given new flow passes through the switches using the priority queue levels for the new flow in at least one of the switches.

In one embodiment, the QoS controller 120 receives QoS requirements for flows. For example, an administrator may input QoS requirements to the QoS controller 120 using the GUI window 210. By way of example, the inputs to the QoS controller 120 may include identifications of flows and their QoS requirements, such as bandwidth, latency, and error rates, among others.

Figure 5:
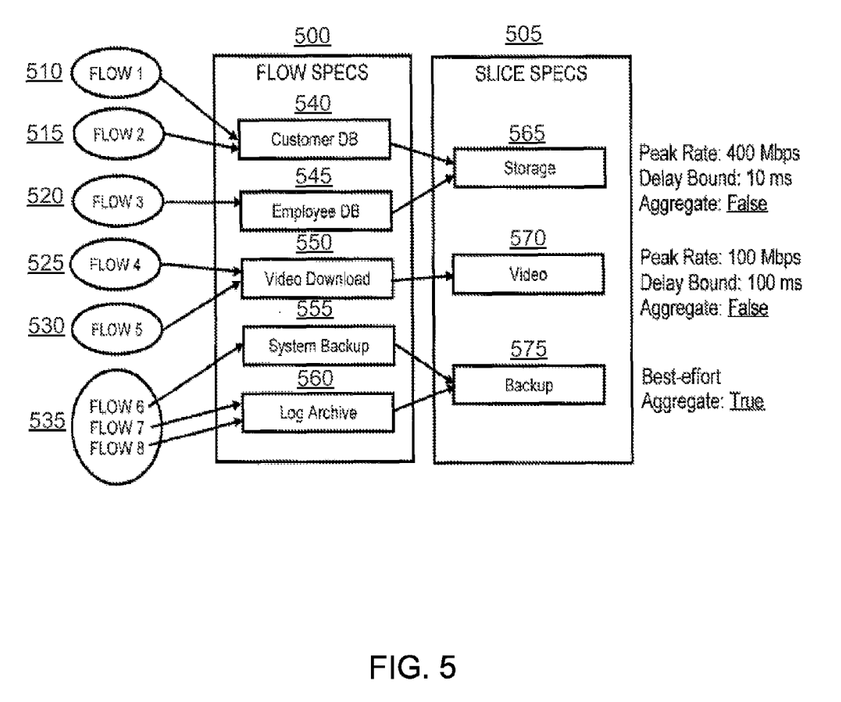
FIG. 5 is an example block diagram for adaptively aggregating flows with the adaptive flow aggregator module of FIG. 2.

As described in more detail below, a given flow may be identified based on flow specifications (e.g., the flow specifications 500 as shown in FIG. 5) through bits in one or more fields in network packets. The flow specifications may include a set of header fields, as well as wildcard fields (e.g., to identify multiple flows belonging to a group). A given flow specification may have a reference to slice specifications (e.g., slice specifications 505 as shown in FIG. 5) that specify QoS requirements for the flows in a given network slice. A network slice, as generally described, herein, is a portion of a network used by a flow to send packets. For example, flows having the same or a similar network service, such as a VoIP service or a file download service may share the same slice. The QoS controller 120 may reserve resources for a given flow in its slice. In various embodiments, the switches 101-141 receive packets at their ports (e.g., ports 107a-n in switch 101 as shown in FIG. 1) and determine a flow specification for a given packet by extracting certain header fields and other meta-information from the packet.

By way of example, a new flow may be routed from the host 140 to the host 150 via the switches 101-141 in the network 130. The QoS controller 120 first determines a QoS requirement for the new flow. The QoS controller 120 then derives configuration specifications and sends the derived configuration specifications to the switches 101-141. At least one of the switches 101-141 may configure the priority queue level for the new flow based on the received, configuration specifications to accommodate the QoS requirements of the new flow.

In an embodiment, one or more of the switches 101-141 may also configure a rate-limiter for the flow (e.g., one of rate-limiters 106a-b in switch 101) based on the received configuration specifications. When the flow comes to the network 130, the QoS controller 120 calculates resource allocation based on collected information and performance models. Then, the QoS controller 120 sends configuration information for a rate-limiter (e.g., one of rate-limiters 106a-c in FIG. 1) in the ingress edge switch of the new flow, and configures the priority queue levels for the flow in the network path. The collected information may be acquired by having the QoS controller 120 communicate with the switches 101-141 through the QoS APIs. The QoS controller 120 builds and maintains information about the current network state and uses this information for deciding QoS configurations in switches 101-141. It is appreciated, that in one embodiment, the switches 101-141 may implement the Converged Enhanced Ethernet ("CEE") and DiffServ QoS frameworks, which are internally based on rate-limiters and priority queues. Examples of network state information include network topology, active flows, performance metrics, and available resources in at least one switch, among others.

The resultant configurations may be sent to the switches 101-141 through the QoS APIs, and resources may then be reserved to provide the requested performance to the new flow. The QoS APIs make available hardware switch QoS capability, rate-limiters and priority queues to the QoS controller 120. The QoS APIs may be operable to allocate flows flexibly to those rate-limiters and priority queues.

Figure 3:
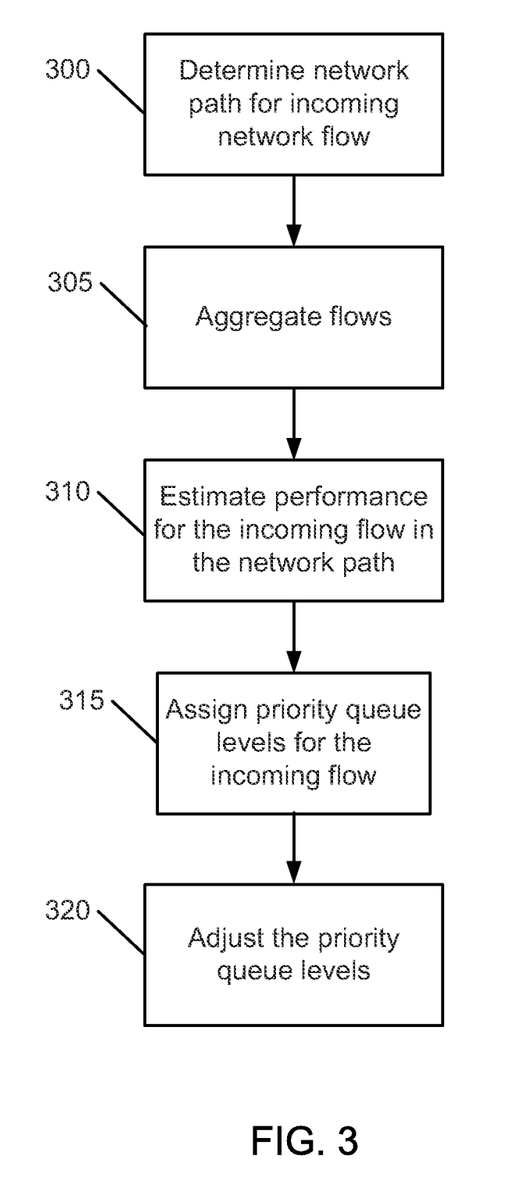
FIG. 3 is an example flowchart for handling a QoS flow using the QoS controller of FIG. 2.

An example flowchart for handling a QoS flow using the QoS controller of FIG. 2 is illustrated in FIG. 3. In various embodiments, when a new flow arrives, the first packet of the flow is delivered to the QoS controller 120. The QoS controller 120 determines a path for the flow (300) and, based on its global policy, the QoS controller 120 determines if the flow is a QoS-sensitive flow. The QoS controller 120 then aggregates the flow (305) with any other existing flows in the network in the adaptive flow aggregator module 201 as appropriate (and as described, below with reference to FIG. 5), and estimates the performance of the flow in the network with the performance module 202 (310).

Based on the performance estimation, the QoS controller 120 dynamically assigns priority queue levels for the flow (315) and adjusts the priority queue levels (320) to ensure a balanced distribution of priority levels at one or more of the switches in the network path. The output of the QoS controller 120 is the setting of the rate limiters at the edge switches and priority queue levels for the new flow in the network path. These settings may be deployed at one or more of the switches 101-141 via the QoS APIs.

Figure 4:
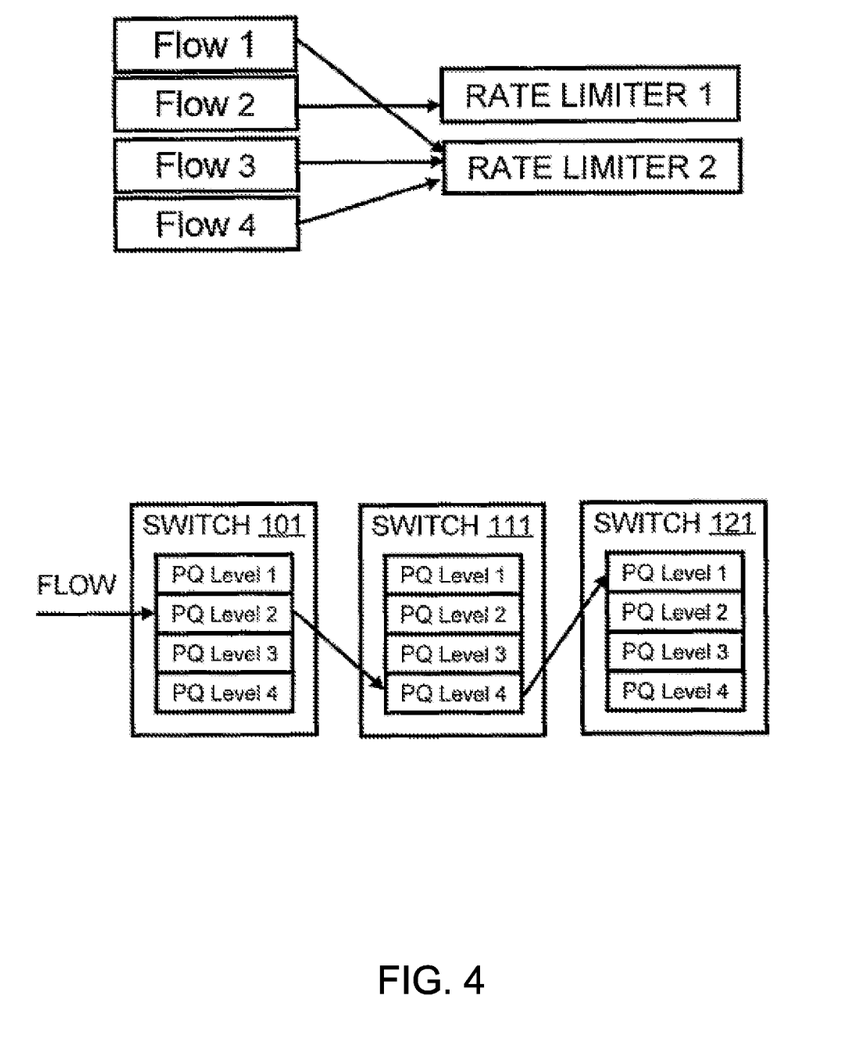
FIG. 4 is an example schematic diagram for a rate limiting and priority queue assignment for a QoS flow.

An example rate limiting and priority queue assignment according to one embodiment is illustrated in FIG. 4. As described above, the QoS controller 120 may assign flows to different priority queue levels at different switches in the network path. Placing flows in higher priority queue levels may increase the flows' throughput and decrease their latency. The QoS controller 120 therefore manages priority queue assignments across all flows and on a per switch basis to achieve fine grained reactive control. As described in more detail below, this entails dynamically balancing flows across multiple priority queue levels in a given switch to more evenly distribute flows in the given switch and increase the overall admission of flows in the network while satisfying their QoS and performance requirements.

By using rate limiters, the QoS controller 120 may assign an individual flow or a set of flows to one of the rate limiters to enforce aggregate bandwidth usage. For example, the QoS controller 120 may assign flows 1-4 to one of rate limiter 1 or rate limiter 2 to enforce aggregate bandwidth usage, e.g., flows 1, 3, and 4 may be assigned to rate limiter 2 and flow 2 may be assigned to rate limiter 1. By using this assignment, the QoS controller 120 may assign a flow to one of the priority queue levels in the outgoing port of the switches 101-141, thus managing the bandwidth and delay allocation for the flow on a per-switch basis. For example, the QoS controller 120 may assign a flow from priority queue level 2 at switch 101 to priority queue level 4 at switch 111, and then to priority queue level 1 at switch 121. These dynamic assignments are very flexible because the QoS controller 120 can decide them based on the current network workload on a per-switch basis.

The QoS controller 120 may also store and keep network state information up-to-date with the current state of the network to avoid an inconsistency that can lead to under-utilization of network resources as well as performance violations. The QoS controller 120 may combine passive and active monitoring on the network to dynamically update its state. For passive monitoring, the QoS controller 120 uses packets forwarded to the QoS controller 120. For example, the QoS controller 120 may intercept LLDP and DHCP packets exchanged in networks and updates the network topology accordingly. The QoS controller 120 updates the available resource database when it adds or deletes the QoS configurations in switches 101-141. The QoS controller 120 queries flow tables from switches 101-141 to periodically check and fix any inconsistencies. The QoS APIs may also query QoS configurations in switches 101-141 from the QoS controller 120.

The following description presents the adaptive flow aggregator module 201, the performance module 202, and the queue assignment module 203 in more detail.

Referring now to FIG. 5, an example block diagram for adaptively aggregating flows with the adaptive flow aggregator module 201 of FIG. 2 is illustrated. In various embodiments, the adaptive flow aggregator module 201 categorizes individual flows into groups and allocates resources based on the groups. Doing so prevents the QoS controller 120 from having to compute resource allocations for every single flow and implement QoS actions on switches on a per-flow basis, thereby reducing its computational and storage overhead.

For example, flows 1-8 may be aggregated into 6 groups, e.g., groups 510-535. A given flow may be identified based on flow specifications (e.g., flow specifications 500) through bits in one or more fields in network packets. The flow specifications 500 may include a set of header fields, as well as wildcard fields (e.g., to identify multiple flows belonging to a group), to represent a set of flows for each service in the network. Services may include, for example, a customer database ("DB") service 540, an employee DB service 545, a video download service 550, a system backup service 555, and a log archive service 560. It is appreciated that not every service isolates individual flows of the service. Instead, some services may use aggregated resource reservation for their traffic.

Each flow specification 500 may have a reference to slice specifications (e.g., slice specifications 505) that specify QoS requirements (e.g., bandwidth, delay, and the like) for the flows in a given network slice. For example, flows having the same or a similar network service, such as a VoIP service or a file download service may share the same slice. The QoS controller 120 may reserve resources for a given flow in its slice. The slice specifications 505 may include, for example, a storage slice 565, a video slice 570, and a backup slice 575.

In the example shown in FIG. 5, flows 1 and 2 have the customer DB flow spec 540, flow 3 has the employee DB flow spec 545, flows 4 and 5 have the video download flow spec 550, flow 6 has the system backup flow spec 555, and flows 7 and 8 have the log archive flow spec 560. Further, the customer DB (540) and the employee DB (545) flow specs are related to the storage slice spec 565, the video download flow spec 550 is related to the video slice spec 570, and the system backup (555) and the log archive (560) flow specs are related to the backup slice spec 575. Therefore, flows 1, 2, and 3 are grouped into the storage slice 565, flows 4 and 5 are grouped into the video slice 570, and flows 6, 7, and 8 are grouped into the backup slice 575.

In addition to the QoS requirements, the slice specifications 505 may also have an aggregate marker field to indicate that the QoS controller 120 may reserve resources for the aggregate flows in a given slice. For example, the QoS controller 120 may configure QoS "knobs" for all flows from different services to specify and adjust the QoS requirements for the given slice. In one embodiment, once the configuration is done for the first flow, all the following flows may share network resources without contacting the QoS controller 120.

Figure 6:
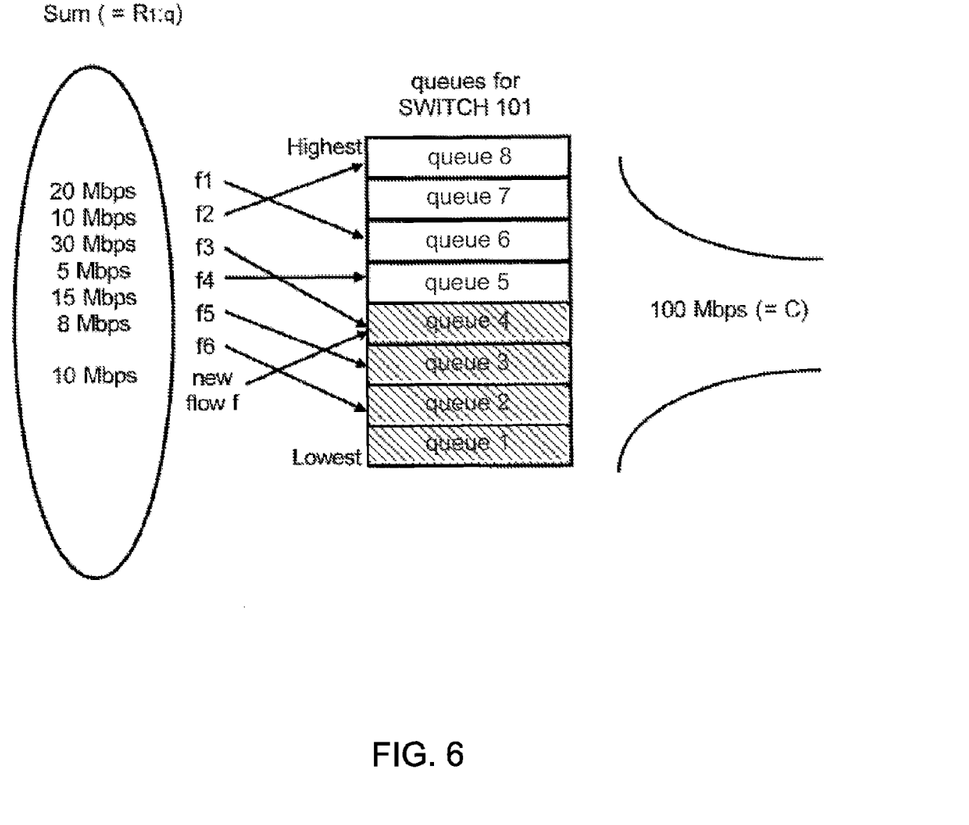
FIG. 6 is an example schematic diagram of a performance model implemented in the performance module of FIG. 2.

Referring now to FIG. 6, an example schematic diagram of a performance model for estimating the performance that a flow will experience in the network 130 with the performance module 202 of FIG. 2 is illustrated. According to various embodiments, a performance model is implemented by performance module 202 to provide the worst case bandwidth and delay for a flow with a given QoS configuration. Based on this model, the QoS controller 120 ensures that a new flow will receive its requested performance and that its addition to the network 130 will not cause QoS requirement violations for other existing flows in the network. The performance model is based on QoS knobs, such as rate-limiters and static priority queue levels.

Let the bandwidth and delay requirement for a new flow f be denoted by $(r_f, d_f)$ respectively. To guarantee that the new flow f receives the requested bandwidth $r_f$, the maximum rate of traffic from the other flows in shared links with the new flow is calculated and compared to $(C-r_f)$, where C is a link capacity of the network. That is, for the QoS controller 120 to meet the bandwidth requirement $r_f$ of the new flow on a given link in the flow's network path, the following condition should be satisfied:

$$(C-r_f) > r_2 \quad \text{(Eq. 1)}$$

where $r_2$ is the bandwidth requirement of the existing flows on the given link in the network. The above check for residual capacity after deducting the maximum rate of traffic from the other flows in shared links from the new flow's path may be checked on each link along the path. In one embodiment, the QoS controller 120 may install a rate limiter in the ingress edge switch of the flow to limit the amount of traffic injected into the network from the flow source.

With respect to the delay requirement, there are two delays that need to be considered: a specified delay requirement for the new flow; and a delay experienced by the new flow at the switches in its network path. The specified delay requirement for the new flow may be specific to the new flow and it may be predicted. Evaluating the delay experienced by the new flow at the switches in its network path may be more complicated due to the dependent behavior of priority queues.

For example, FIG. 6 shows a representative switch (e.g., switch 101) output port with 100 Mbps capacity. In this model, packets are queued and dropped at output ports. The port shown has eight (8) static priority queues $q_1$ for six (6) flows $(f_1, f_2, \ldots, f_6)$. A new flow f may be assigned to any priority queue level, such as, for example, the priority queue level $q_4$. The per-hop delay that/will experience in priority queue level $q_4$, denoted, by $D_f$, may be determined by how fast packets arrive at queues having higher or equal priorities (from $q_4$ to $q_8$) and how fast the link can drain the packets. That is, the delay experienced by the new flow at a particular switch in the network may be a function of:

$$D_f = f(q, R_{q:8}, C) \quad \text{(Eq. 2)}$$

where q is the priority queue for f (e.g., q=4), and $R_{q:8}$ is the sum of maximum rates of flows between $q_4$ and $q_8$.

The condition to be met is that that the sum of the delay experienced at all the switches in the network should be less than the specified delay requirement, that is:

$$\text{Sum}(D_f) < D_s \quad \text{(Eq. 3)}$$

An implication of the delay requirement is that flows in the same port can impact each other in terms of delay bound. For example, as shown in FIG. 6, a delay bound of the new flow f is affected by the flow $f_1$, the flow $f_2$ and the flow $f_4$. The delay bound of the new flow f also lowers delay bounds for the flow $f_3$, the flow $f_5$, and the flow $f_6$. As a result of adding the new flow f to the network, some flows now have lower delay bounds. The QoS controller 120 might not be able to find a queue for the new flow f in the next hop if one of the affected, flows passes the same hop and its delay bound reaches the delay requirement.

In one embodiment, the QoS controller 120 may consider both the interactions between flows in the same hop and the interactions with flows in the remaining hops to decide queue assignment for a new flow. However, as there can be a large number of flows over multiple hops, it may be computationally expensive to find a queue assignment that satisfies the delay requirement of the new flow f while not violating the requirements of existing flows. It is important to reduce delay in processing new flows for faster flow setup time.

Figure 7:
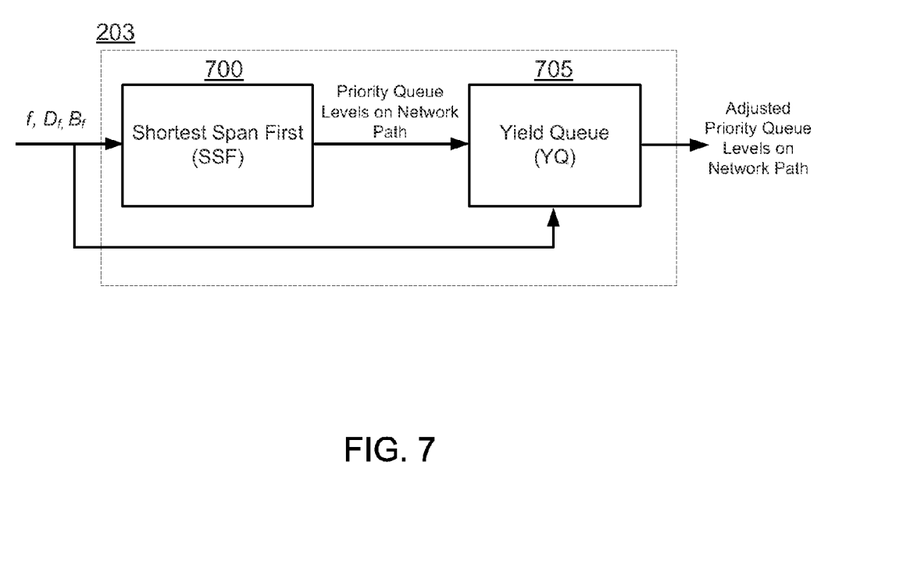
FIG. 7 is an example block diagram for assigning priority queue levels with the queue assignment module of FIG. 2.

FIG. 7 illustrates an example block diagram for determining a network path for a new flow with the queue assignment module 203 of FIG. 2. The goal of the queue assignment module 203 is to maximize the probability of satisfying the QoS requirements of a new flow while minimizing the number of rejected flows. In doing so, the QoS controller 120 can use the global knowledge of the network state information in handling flows for better utilization of network resources. Specifically, the QoS controller 120 should intelligently assign flows to priority queues in switches in order to maximize the chance to admit the new flow as well as future flows.

It is appreciated that the priority queue assignment may affect the end-to-end delay of a given flow. The important implication of the delay model described above with reference to FIG. 6 is that flows in the same port can impact each other in terms of delay bound. For example, in FIG. 6, f's per-hop delay is affected by $f_1$, $f_2$, $f_3$, and $f_4$, and f, in turn, increases the per-hop delay (and end-to-end delay) for $f_3$, $f_5$, and $f_6$ at the same time. As a result of adding f, some flows may have higher end-to-end delays and the QoS controller 120 might not be able to find a queue for f in the next hop if one of the affected flows passes the same hop and its end-to-end delay exceeds f's delay requirement.

The QoS controller 120 should therefore consider both the interactions between flows in the same hop and the interactions with flows in the remaining hops to determine queue assignments for a new flow. However, as there can be a large number of flows over multiple hops in practice, it may be computationally expensive to find a queue assignment that satisfies f's delay requirement while not violating the requirements of existing flows. One would appreciate that it is important to reduce delay in processing new flows for faster flow setup time.

With these considerations in mind, the queue assignment module 203 implements a two-step technique for determining a queue assignment for a new flow, including: (1) a shortest-span first ("SSF") technique 700; and (2) an yield-queue ("YQ") technique 705. The SSF technique 700, in one embodiment, determines queue assignments in every output port that the new flow f passes. The YQ technique 705 may be applied after the SSF technique 705 to adjust its queue assignments depending on the delay specifications of the new flow and the end-to-end delay the flow would, experience in the path. The adjustment enables loose QoS flows yield the high priority queue to tight QoS flows, which does not decrease the possibility of rejecting loose QoS flows, but rather, increases the overall admission ratio of flows in the network.

Figure 8:
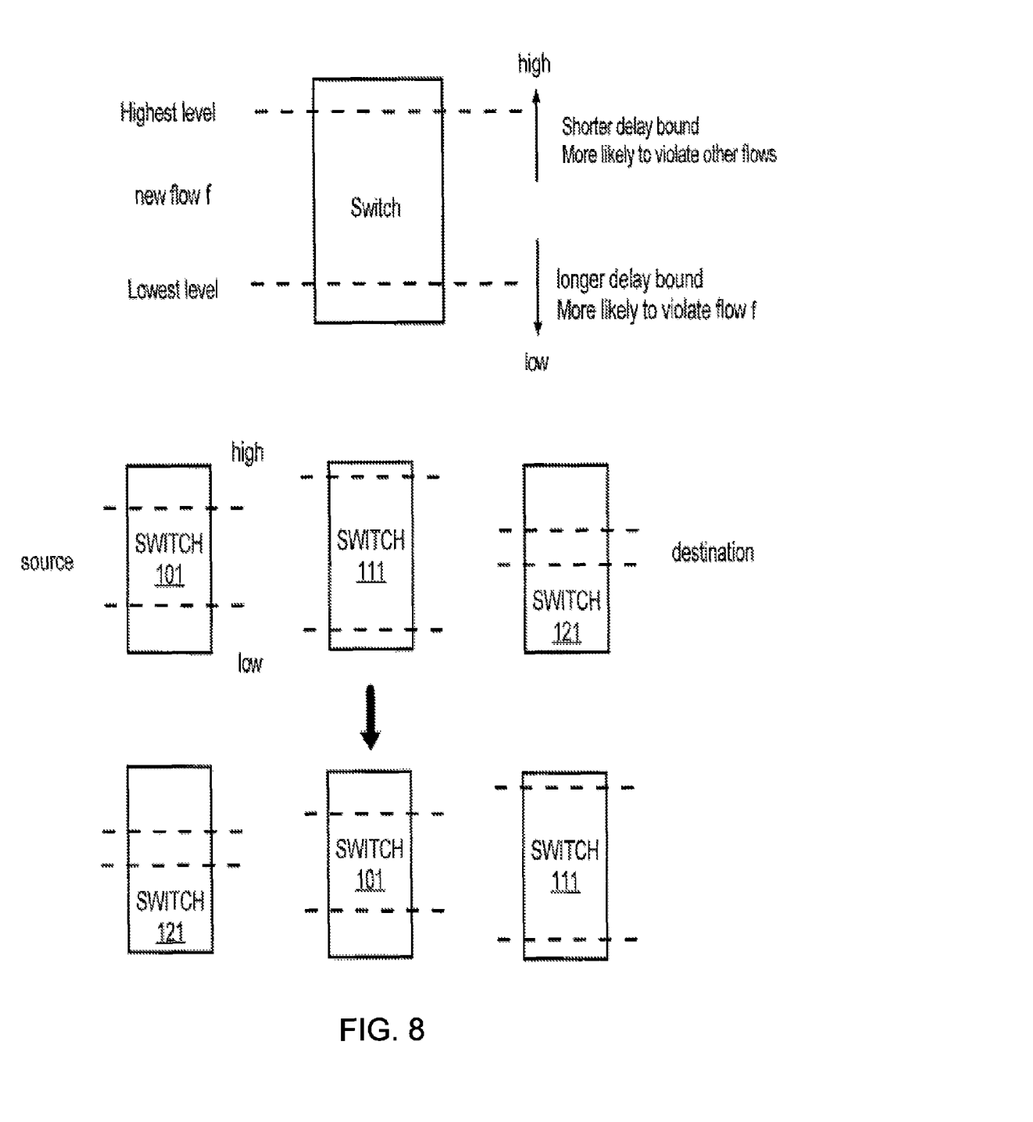
FIG. 8 is an example schematic diagram for the shortest span technique of FIG. 7.

The SSF technique 700 is illustrated in FIG. 8. The idea behind the SSF technique 800 is to first consider the port with less available options to avoid rejection of a new flow f while trying to find the best delay bound for f. Given an output port and the new flow f, a queue from, for example, queues $q_1$ to $q_8$ (shown in FIG. 6, with $q_8$ as the highest priority queue) may be selected for the new flow f. If the new flow f is put into $q_8$, it will get the shortest per-hop delay bound, but negatively affect all the existing flows in the output port. Likewise, f will affect a small number of flows but will get a high delay bound if it is put into $q_1$.

Accordingly, in one embodiment, the SSF technique 700 computes, in each port: (1) the highest level for f, i.e., the highest possible priority queue not violating the QoS requirements of any existing flows; and (2) the lowest level for f, i.e., the lowest possible priority queue not violating the QoS requirements off These levels are denoted as $high_f$ and $low_f$, respectively. The span between these two levels, i.e., $high_f$-$low_f$, represents the available options for the new flow f in the output port. For example, if the new flow f is assigned into a queue in the first output port it encounters, the spans of the other ports may shrink, and f should be rejected if a given port has a zero span.

Therefore, in the SSF technique 700, the QoS controller 120 sorts output ports by the computed spans, assigns the new flow f to the highest level in the first port, and re-computes spans for the remaining ports. The QoS controller 120 may repeat this process until there is no remaining port for the new flow f. In one embodiment, the QoS controller 120 may sort ports in the order of increasing span.

For example, as shown in FIG. 8, the switch 111 has the longest span, the switch 121 has the shortest span, and the switch 101 has the mid span among the switches 101, 111, and 121. Therefore, the QoS controller 120 assigns a priority queue level of the new flow f at each of the switches 101, 111, and 121 based on an increasing order of spans of the switches 101, 111, and 121 for the new flow f. Thus, the priority queue level of the new flow f is assigned with the switch 121 first and then with the switch 101, and lastly with the switch 111. In one embodiment, the priority queue level of the new flow f is assigned with each of the switches 101, 111, and 121 in the increasing order of spans using the highest priority queue level of the new flow f at each of the switches 101, 111, and 121. The QoS controller might repeat this process for other paths available for the new flow f, if its QoS requirements cannot be met by the current path.

It is appreciated that with the SSF technique 700, the QoS controller 120 can assign f to different priority queues on a per-switch basis depending on the current workloads on the path. For example, if a switch port has many delay-sensitive flows, the SSF technique 700 can assign f to a low priority queue to avoid violating the existing delay-sensitive flows. Since this can lead to longer per-hop delays for f, the QoS controller 120 can increase f's priority in the other switches on the path in order to satisfy the end-to-end delay requirement of f.

It is further appreciated that the SSF technique 700 aims to maximize the probability of admitting a new flow. Once the flow is admitted, the SSF technique 700 assigns it to the highest priority queue levels in order to deliver a low end-to-end delay. Using this greedy allocation, the QoS controller 120, however, can put the flow into a high priority queue even when the flow's delay requirement can be satisfied in a lower priority queue based on the current state of existing flows. The result is that with the SSF technique 700 the majority of flows may be assigned to the highest priority queue ($q_8$), which may not be desirable because the highest priority queue should be used for flows with stricter delay requirements.

Accordingly, after an initial queue assignment is determined with the SSF technique 700, the queue assignment module 203 applies the YQ technique 705 to adjust the assignment based on flow delay requirements. The basic idea of the YQ technique 705 is that the QoS controller 120 dynamically finds a low priority queue that satisfies two conditions. The first condition is that the new priority queue should not violate the admitted flow. However, the new flow cannot be put into the lowest level queue as the flow's end-to-end delay would be increased and can be close to its delay-bound requirement. The QoS controller 120 also should not assign future flows to the highest priority queue. That is, assigning a flow to a too low priority queue can also lower the probability of admitting future flows. To address this, the second condition ensures that the new flow should have a higher delay margin, i.e., the difference between its delay-bound requirement and the end-to-end delay, than the minimum delay margin in the queue.

Figure 9:
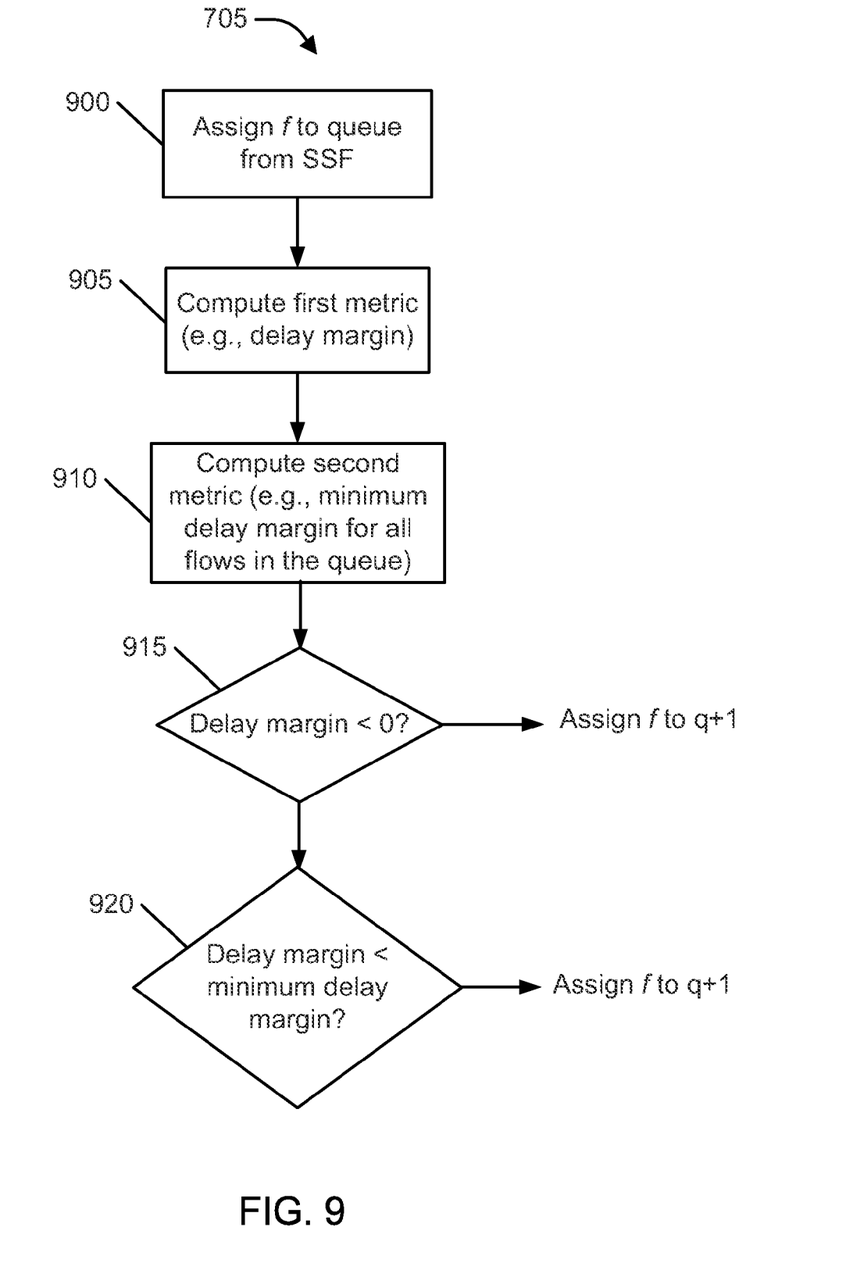
FIG. 9 is an example flowchart for implementing the yield, queue technique of FIG. 7.

Referring now to FIG. 9, an example flowchart for implementing the YQ technique 705 of FIG. 7 is illustrated. A new flow/may initially be assigned a queue q as determined by the SSF technique 700 (900). Based on the performance metrics computed with the performance model 202 (described above with reference to FIG. 6), a first metric such as the delay margin for the new flow, i.e., the difference between the new flow's delay-bound requirement and the expected end-to-end delay, is computed (905). Likewise, a second metric such as the minimum delay margin of ail the flows in the queue is also computed (910). If the delay margin is negative (915) or if the delay margin is smaller than the minimum delay margin (920), the queue assignment from the SSF technique 700 is adjusted so that the new flow f is assigned to a higher priority queue, i.e., to q+1.

Figure 10A:
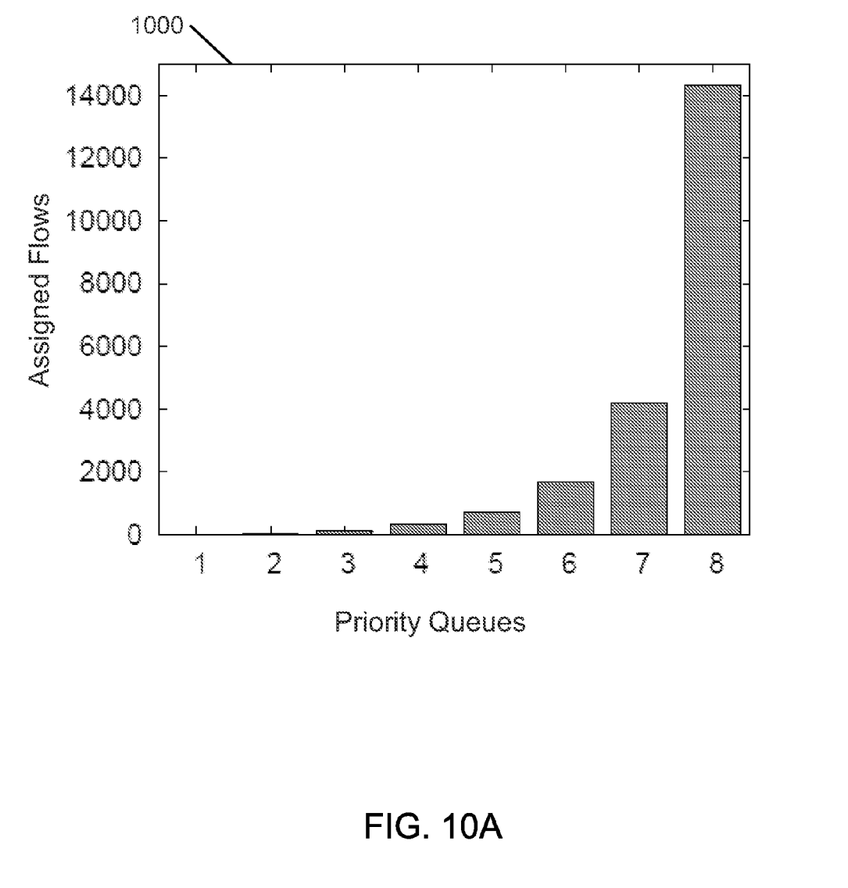
FIGS. 10A-B are example graphs illustrating queue assignment distributions for the shortest span and yield queue techniques of FIG. 7.
Figure 10B:
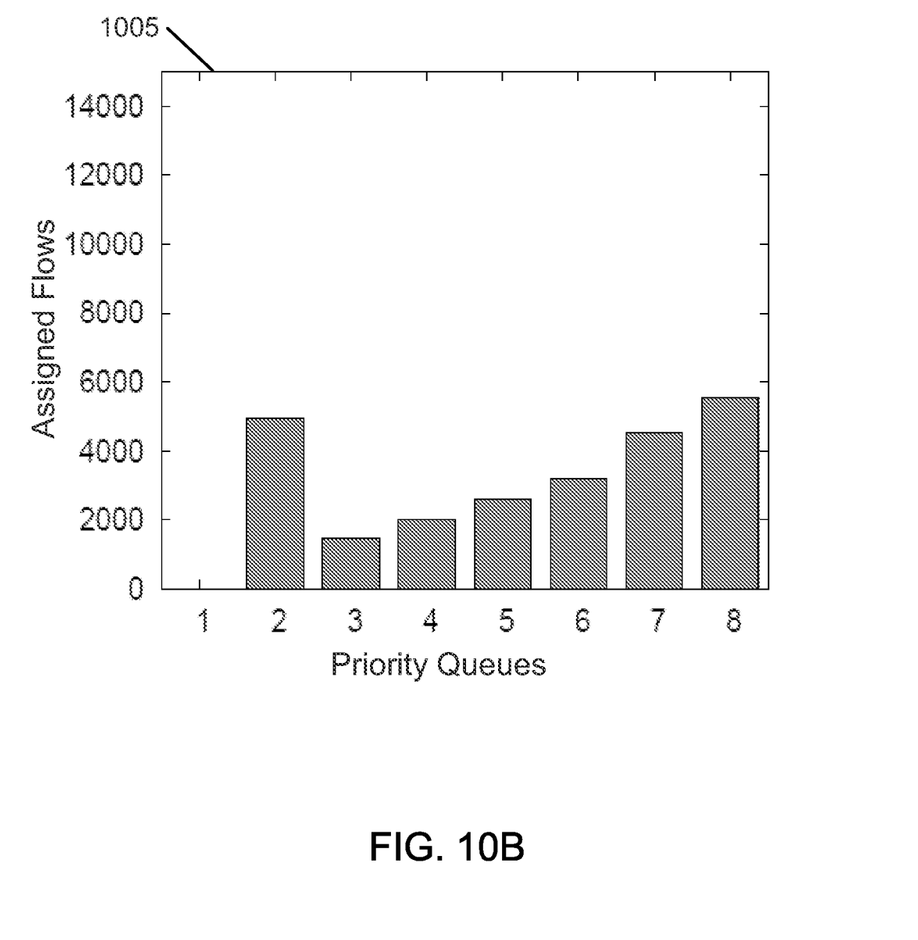

It is appreciated that applying the YQ technique 705 after the SSF technique 700 results in flows to be more balanced and evenly distributed across multiple priority queues. It is also appreciated that the YQ technique 705 can be implemented by itself, without following the SSF technique 700. That is, the QoS controller 120 may choose to dynamically assign priority queues with the YQ technique 705 without first implementing FIGS. 10A-B illustrate example queue assignment distributions for the SSF technique 700 and the YQ technique 705. Graph 1000 (FIG. 10A) shows a queue assignment distribution after applying the SSF technique 700, and graph 1005 (FIG. 10B) shows the queue assignment distribution after applying the YQ technique 705.

As described above, applying the SSF technique 700 results in the majority of flows to be assigned to the highest priority queue ($q_8$), which may not be desirable because the priority queue should, be used for flows with stricter delay requirements. Graph 1005 illustrates that applying the YQ technique 705 after the SSF technique 700 results in admitted flows to be balanced and distributed more evenly across multiple priority queue levels, in addition to admitting more flows (at least 10% more than using the SSF technique 700 alone). With this balanced, queue assignment distribution, the QoS controller 120 can let loose QoS flows yield the high priority queue levels to tight QoS flows to improve the overall flow admission ratio.

The previous description of the disclosed embodiments is provided to enable any person skilled, in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited, to the embodiments shown herein but is to be accorded the widest scope consistent with the principles and novel features disclosed herein.

Those of skill in the art would further appreciate that the various illustrative modules and steps described in connection with the embodiments disclosed herein may be implemented as electronic hardware, computer software, or combinations of both. For example, the modules 201-203 in FIG. 2 may comprise software modules, hardware modules, or a combination of software and hardware modules. Thus, in one embodiment, one or more of the modules 201-203 may comprise circuit components. In another embodiment, one or more of the modules 201-203 may comprise software code stored on a computer readable storage medium, which is executable by a processor.

To clearly illustrate this interchange-ability of hardware and software, various illustrative components, blocks, modules, and steps have been described above generally in terms of their functionality (e.g., module 201 is generally used to aggregate flows, module 202 is generally used to compute performance metrics for flows, and module 203 is generally used to determined, priority queue assignments). Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

What is claimed is:

1. A quality-of-service ("QoS") controller to support QoS flows in a network, the QoS controller comprising:
    a performance module to estimate performance metrics for an incoming QoS flow associated with a set of QoS requirements and with a network path having a plurality of network switches, the performance metrics including a delay experienced by the incoming QoS flow in at least one of the plurality of network switches in the network path; and
    a queue assignment module to assign priority queue levels to the incoming QoS flow in at least one of the plurality of network switches in the network path based on the performance metrics of the incoming QoS flow and to adjust the priority queue levels to distribute the QoS flows over multiple priority queue levels in at least one of the plurality of network switches in the network path,
    wherein to adjust the priority queue levels, the queue assignment module is to compute a delay margin for the incoming QoS flow, the delay margin comprising a difference between the delay experienced by the incoming QoS flow in the at least one of the plurality of network switches in the network path and an expected end-to-end delay for the incoming QoS flow in the network path.

2. The QoS controller of claim 1, wherein the QoS controller further comprises a module to determine the network path for the incoming QoS flow.

3. The QoS controller of claim 1, wherein the QoS controller further comprises a module to aggregate the incoming QoS flow with other existing QoS flows in the network.

4. The QoS controller of claim 1, wherein to assign priority queue levels to the incoming QoS flow comprises to determine a lowest priority queue level and a highest priority queue level in at least one of the plurality of network switches in the network path that satisfy the set of QoS requirements associated with the incoming QoS flow.

5. The QoS controller of claim 4, wherein the queue assignment module computes a span for at least one of the plurality of network switches in the network path, wherein the span comprises a difference between the highest and lowest priority queue levels.

6. The QoS controller of claim 5, wherein the queue assignment module sorts the plurality of network switches in the network path according to their span into a sorted list of network switches.

7. The QoS controller of claim 4, wherein to assign priority queue levels to the incoming QoS flow, the queue assignment module is to assign the highest priority level to the incoming QoS flow in at least one of the plurality of network switches in the network path.

8. The QoS controller of claim 5, wherein the queue assignment module re-computes the span for a network switch after a priority queue level is assigned to the incoming QoS flow at a previous network switch in the sorted list of the network switches.

9. The QoS controller of claim 1, wherein the queue assignment module further computes a minimum delay margin for existing flows at the plurality of network switches in the network path.

10. The QoS controller of claim 9, wherein the queue assignment module further adjusts the priority queue levels based on the delay margin for the incoming QoS flow and the minimum delay margin for the existing flows at the plurality of network switches in the network path.

11. A non-transitory computer readable storage medium, comprising executable instructions executed by at least one processor to:
    determine a network path for an incoming flow in a network, the path including a plurality of network switches associated with a plurality of priority queue levels;
    determine a priority queue level for the incoming flow for at least one of the plurality of network switches in the network path based on priority queue levels of existing flows; and
    adjust the priority queue level of the incoming flow to dynamically balance flows over the plurality of priority queue levels for at least one of the plurality of network switches in the network path based on quality-of-service ("QoS") requirements associated with the incoming flow,
    wherein the executable instructions to adjust the priority queue level include executable instructions to compute a delay margin for the incoming flow, the delay margin comprising a difference between a delay experienced by the incoming flow in the at least one of the plurality of network switches in the network path and an expected end-to-end delay for the incoming flow in the network path.

12. The non-transitory computer readable storage medium of claim 11, wherein the executable instructions to determine a priority queue level for the incoming flow comprise executable instructions to determine the priority queue level based on a shortest span for at least one of the plurality of network switches in the network path.

13. The non-transitory computer readable storage medium of claim 1, wherein the executable instructions to adjust the priority queue level further comprise executable instructions to compute a minimum delay margin for all flows in at least one of the plurality of network switches in the network path.

14. The non-transitory computer readable storage medium of claim 13, wherein the executable instructions to adjust the priority queue level further comprise executable instructions to adjust the priority queue level based on the delay margin for the incoming flow and the minimum delay margin for all the flows in at least one of the plurality of network switches in the network path.

15. A non-transitory computer readable storage medium, comprising executable instructions to:
    assign a priority queue level for an incoming network flow, the priority queue level associated with a network switch in a network path for the incoming network flow;

compute a first metric for the incoming network flow based on a quality-of-service ("QoS") requirement and an expected performance associated with the incoming network flow;

compute a second metric for existing flows; and adjust the priority queue level assigned to the incoming network flow based on the first and second metrics to distribute flows over multiple priority queue levels in the network switch, wherein the executable instructions to adjust the priority queue level include executable instructions to compute a delay margin for the incoming flow, the delay margin comprising a difference between a delay experienced by the incoming flow in the network switch in the network path and an expected end-to-end delay for the incoming flow in the network path.

16. The non-transitory computer readable storage medium of claim 15, wherein the first metric comprises the delay margin for the incoming network flow and the second metric comprises a minimum delay margin for the existing flows.

* * * * *